(12) United States Patent
Roberts et al.

(10) Patent No.: US 8,234,478 B1
(45) Date of Patent: Jul. 31, 2012

(54) USING A DATA CACHE ARRAY AS A DRAM LOAD/STORE BUFFER

(75) Inventors: James Roberts, Austin, TX (US); David B. Glasco, Austin, TX (US); Patrick R. Marchand, Apex, NC (US); Peter B. Holmqvist, Cary, NC (US); George R. Lynch, Raleigh, NC (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 576 days.

(21) Appl. No.: 12/256,400

(22) Filed: Oct. 22, 2008

(51) Int. Cl.
G06F 12/00 (2006.01)
G06F 13/00 (2006.01)
G06F 13/28 (2006.01)

(52) U.S. Cl. ....................................................... 711/167

(58) Field of Classification Search .................. None
See application file for complete search history.

(56) References Cited

U.S. PATENT DOCUMENTS

| | | |
|---|---|---|
| 2006/0146852 A1 | 7/2006 | Munagala et al. |
| 2008/0016278 A1* | 1/2008 | Clark et al. .................... 711/118 |
| 2009/0240891 A1* | 9/2009 | Strait et al. ..................... 711/129 |

OTHER PUBLICATIONS

Office Action in U.S. Appl. No. 12/256,402, mailed Apr. 25, 2011.

* cited by examiner

*Primary Examiner* — Kevin Ellis
*Assistant Examiner* — Gary W Cygiel
(74) *Attorney, Agent, or Firm* — Patterson & Sheridan, LLP

(57) ABSTRACT

One embodiment of the invention sets forth a mechanism for using the L2 cache as a buffer for data associated with read/write commands that are processed by the frame buffer logic. A tag look-up unit tracks the availability of each cache line in the L2 cache, reserves necessary cache lines for the read/write operations and transmits read commands to the frame buffer logic for processing. A data slice scheduler transmits a dirty data notification to the frame buffer logic when data associated with a write command is stored in an SRAM bank. The data slice scheduler schedules accesses to the SRAM banks and gives priority to accesses requested by the frame buffer logic to store or retrieve data associated with read/write commands. This feature allows cache lines reserved for read/write commands that are processed by the frame buffer logic to be made available at the earliest clock cycle.

18 Claims, 11 Drawing Sheets

USING A DATA CACHE ARRAY AS A DRAM LOAD/STORE BUFFER

BACKGROUND OF THE INVENTION

1. Field of the Invention

The present invention relates generally to the field of cache systems and, more specifically, to using a data cache array as a DRAM load/store buffer.

2. Description of the Related Art

One element of a memory subsystem within certain processing units is a Level 2 Cache memory (referred to herein as "L2 cache"). The L2 cache is a large on-chip cache memory that serves as an intermediate point between an external memory (e.g., frame buffer memory) and internal client of the memory subsystem (referred to herein as the "clients"). The L2 cache temporarily stores data that the clients are reading from and writing to the external memory which is often a DRAM.

In such a system, coherency has to be maintained between data present in the L2 cache and the data stored in the external memory. "Dirty data," that is, data transferred from a client to the L2 cache during a write operation, needs to remain in the on-chip until the data has been "cleaned," by replicating the data in the external memory. During a read operation, memory space is allocated on-chip to receive the result data from the external memory. Applications that require high data throughput, such as graphics processing, will require considerable amounts of storage space for dirty data and read returns. If a system lacks sufficient storage for these operations, then overall performance will be degraded.

One approach to address these problems is to use distinct load/store data buffers separate from the main L2 cache that act as holding areas for data being transmitted to or received from the external memory. These data buffers are typically FIFO (first-in-first-out) stores and service data reads and writes in the order the operations are received from the L2 cache or the external memory. When the L2 cache receives a read request, the L2 cache allocates memory space in the load data buffer that should receive the result data from the external memory. The load data buffer stores the result data until the L2 cache is ready to receive the result data. In the case of a write operation, the L2 cache receives data from a write client and some time later copies the data to the store buffer in preparation for transfer to the backing store. For a write-through cache, this copy happens immediately; for a write-back cache, this happens upon eviction. In either case, the write data buffer holds the dirty data until the external memory has stored the data.

One drawback to this approach is that the amount of dedicated space allocated to the read and write data buffers is proportional to the throughput of data in the system. Since many systems, like graphics processing systems, require very high throughput, implementing intermediate read and write buffers in such systems consumes a large amount of memory space, making such a solution undesirable.

As the foregoing illustrates, what is needed in the art is an effective data caching mechanism for loading and storing data from and to external memory.

SUMMARY OF THE INVENTION

One embodiment of the present invention sets forth a method for processing a read operation received by an intermediary cache coupled to one or more clients and to an external memory. The method includes the steps of receiving a read command from a client, where the read command includes a corresponding memory address for data being requested by the read command, determining a row within a data cache associated with the read command based on the corresponding memory address, determining that a cache line within the row is available for the requested data, and reserving the cache line in order to schedule a write operation that stores the requested data in the cache line.

One advantage of the disclosed method is that allows the intermediate cache to process read and write operations without using separate load and store buffers for data being received from or transmitted to the external memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
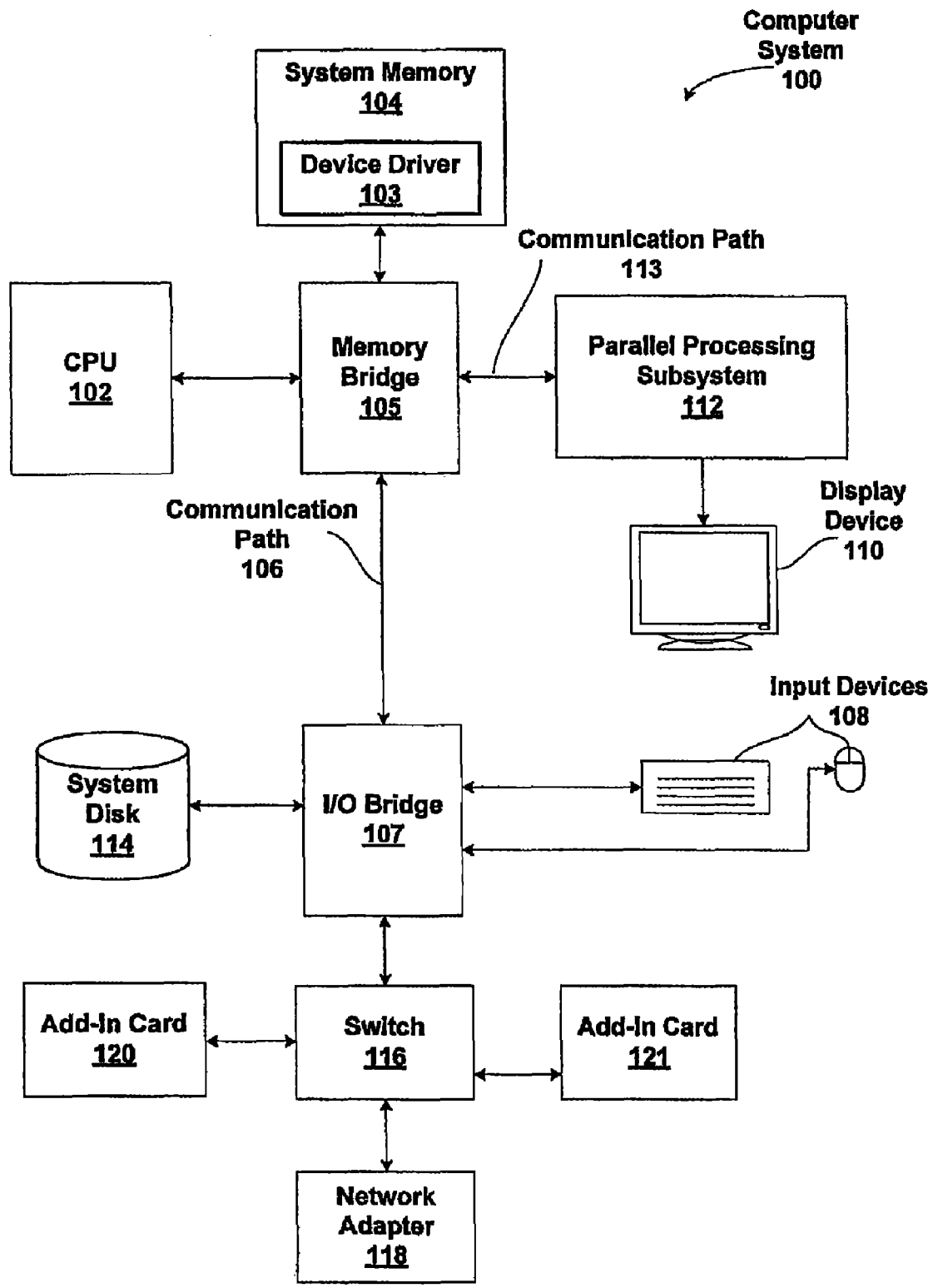
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
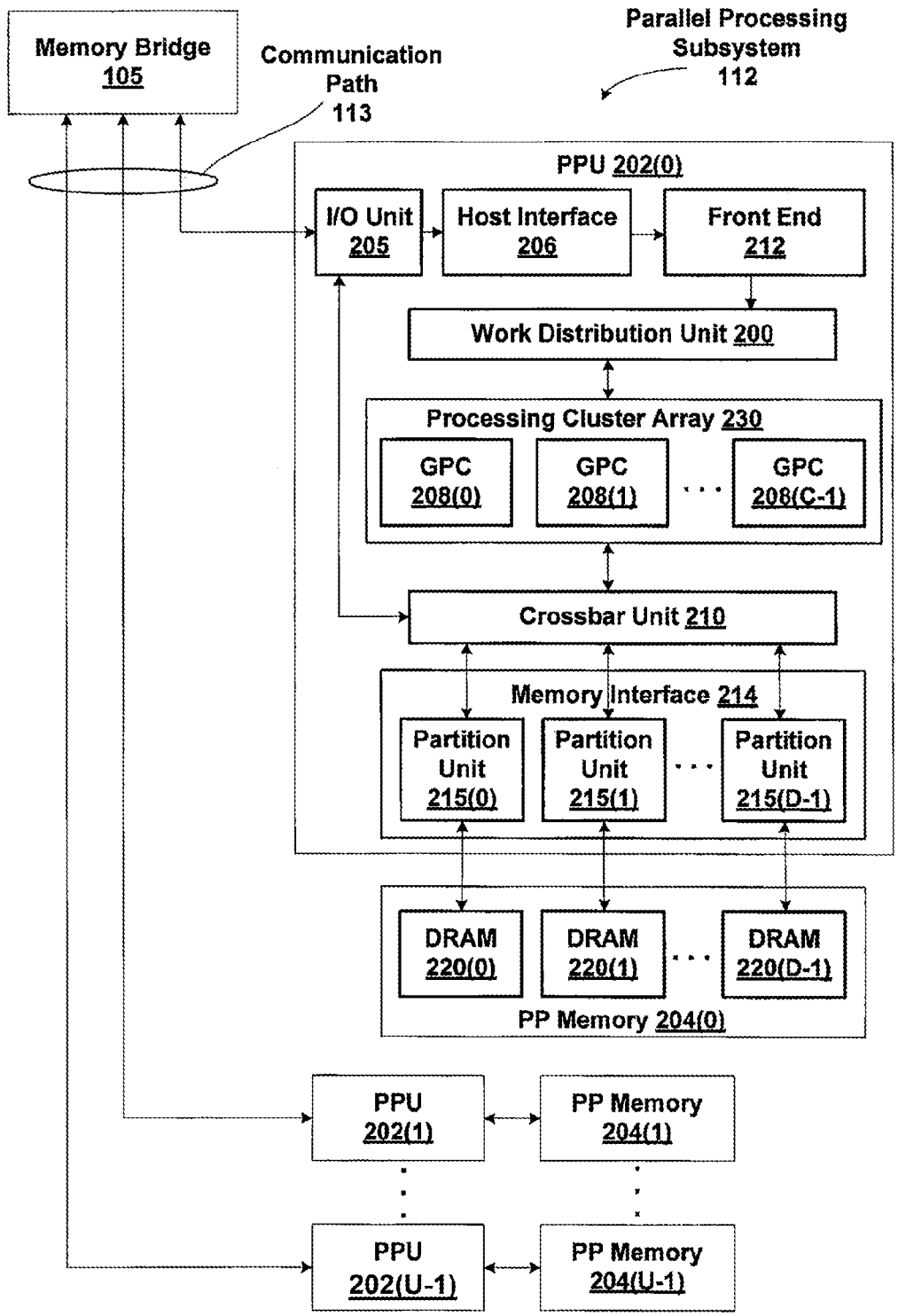
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
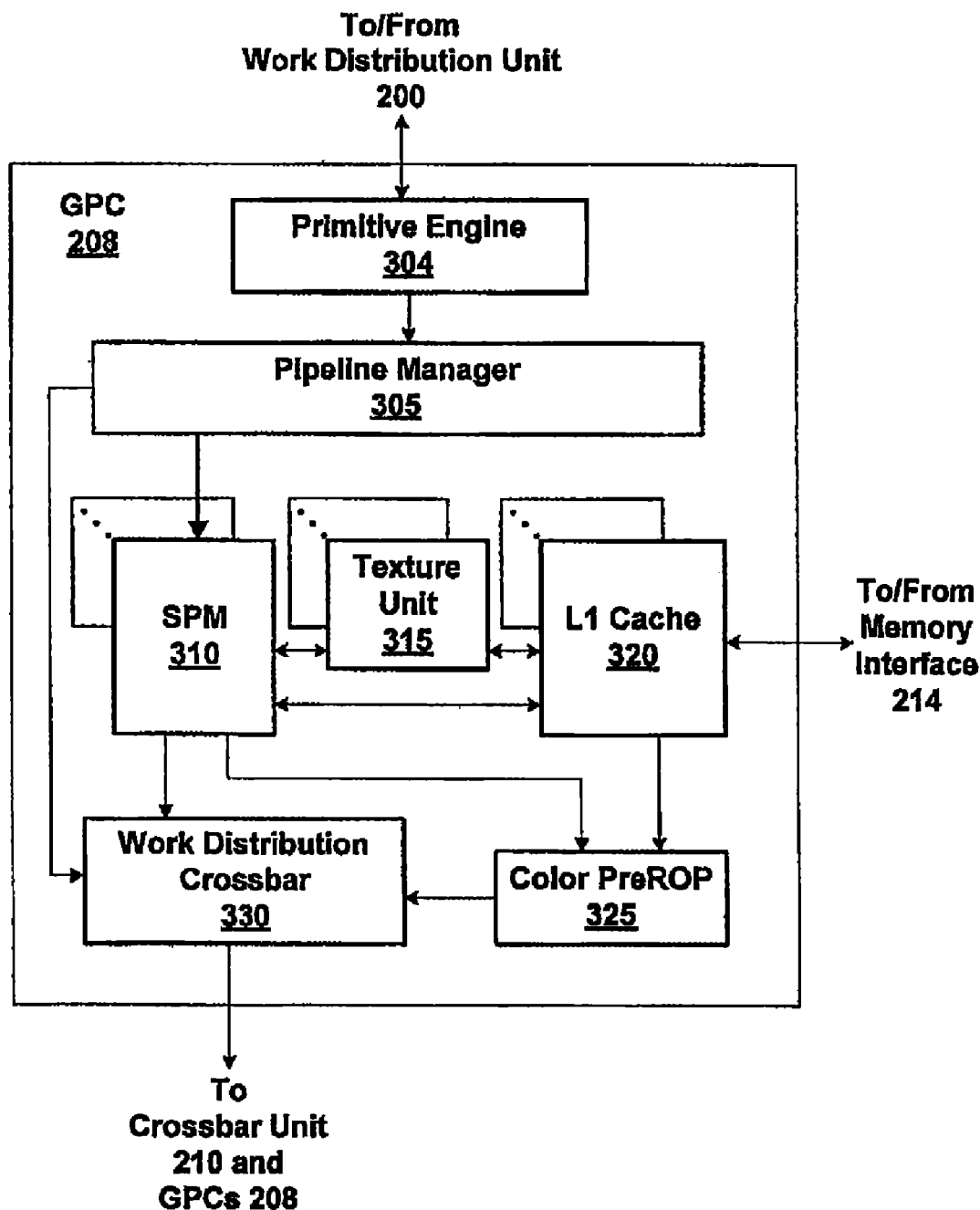
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104.

It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
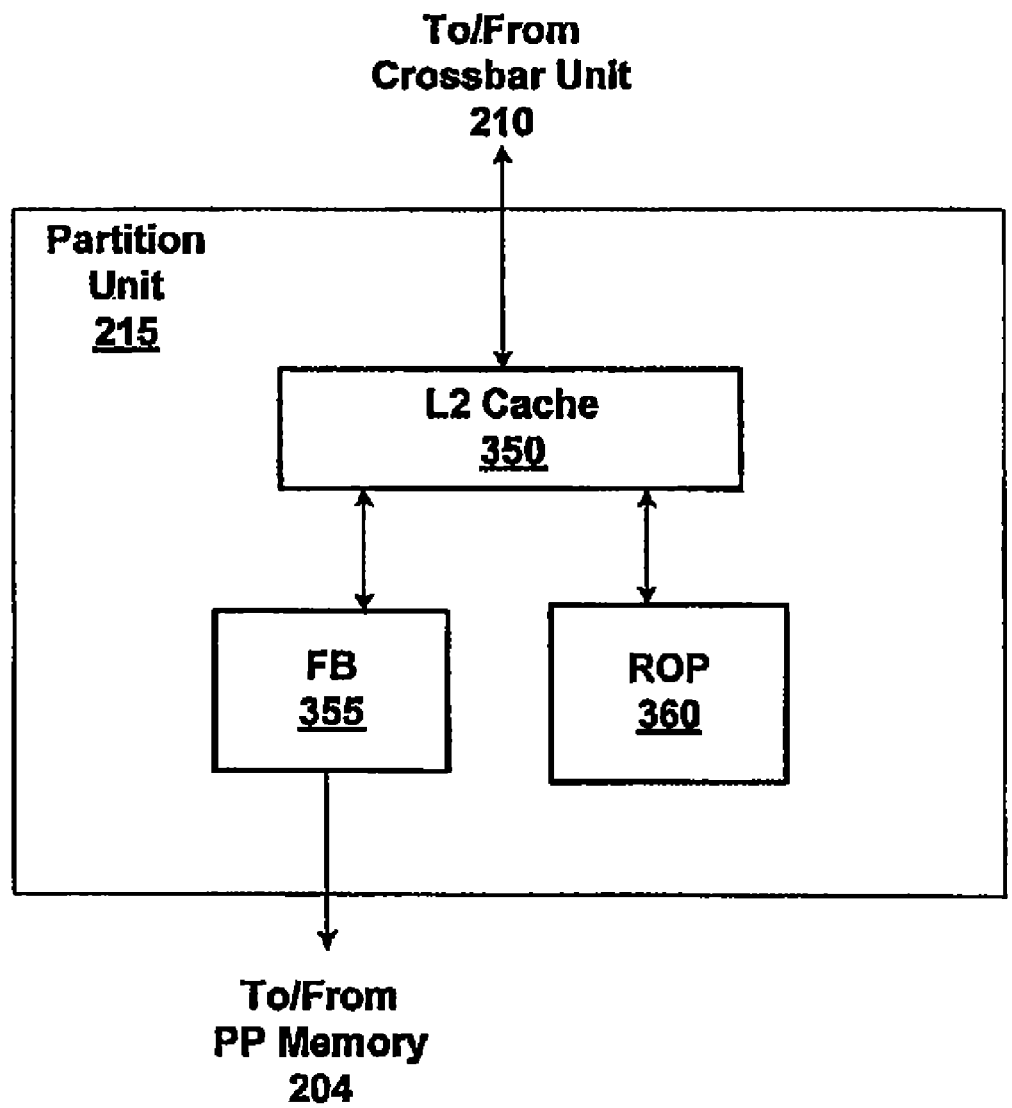
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer logic 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of frame buffer logic 355. Read misses and urgent writeback requests are output by L2 cache 350 to frame buffer logic 355 for processing. Dirty updates are also sent to frame buffer logic 355 for opportunistic processing. The frame buffer logic 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Processing Read/Write Operations

Figure 4A:
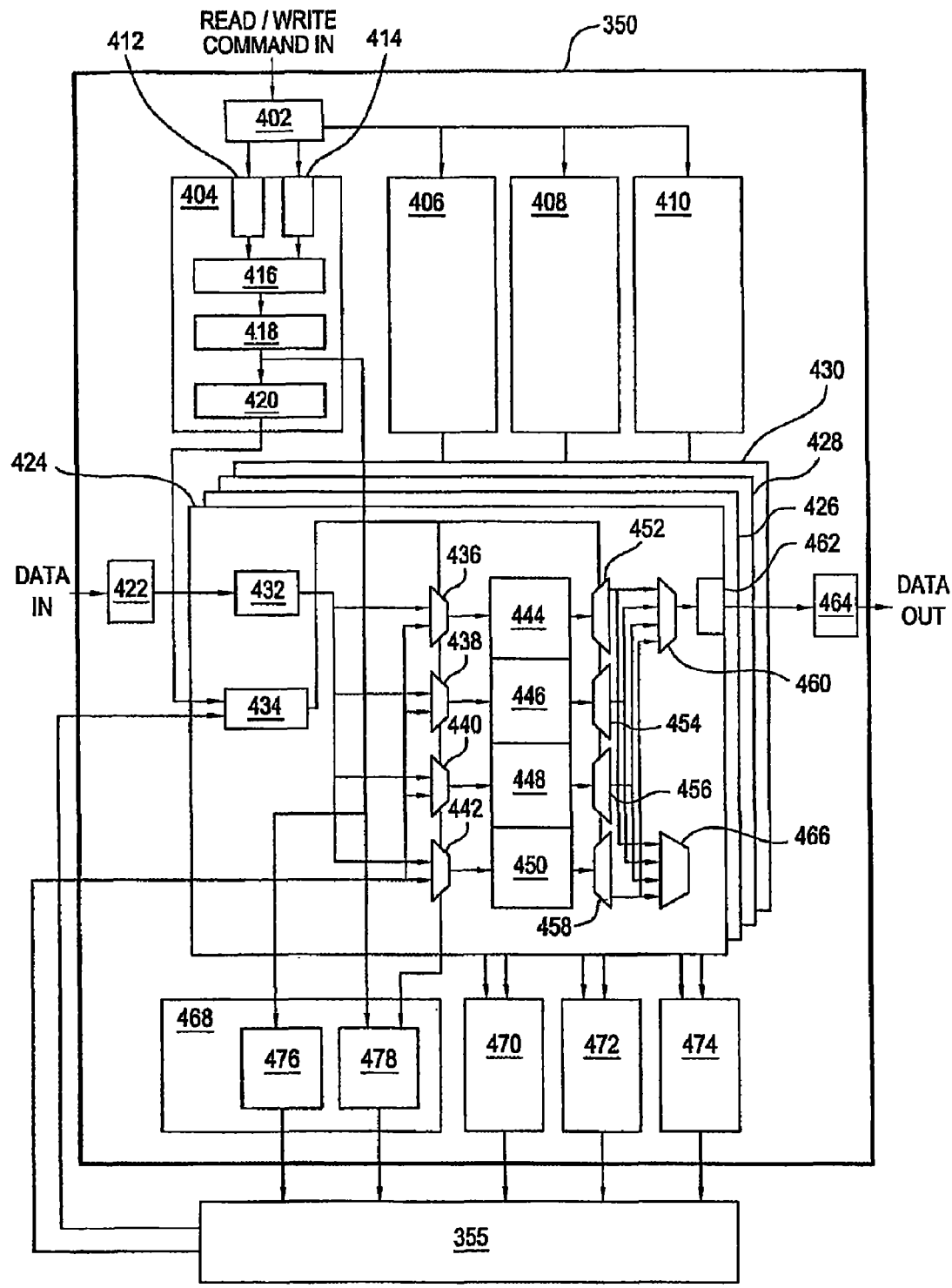
FIG. 4A is a more detailed block diagram of the L2 cache of FIG. 3B, according to one embodiment of the present invention.

FIG. 4A is a more detailed block diagram of the L2 cache 350 of FIG. 3B, according to one embodiment of the present invention. As shown, the L2 cache 350 includes a command interface 402, four L2 command-in interfaces 404, 406, 408 and 410, four L2 cache slices 424, 426, 428 and 430, a write, a read data interface 464 and four L2 command-out interfaces 468, 470, 472 and 474.

The command interface 402 is configured to receive read and write commands from various subsystem clients. The command interface 402 transmits these read and write commands to the L2 command-in interfaces 404, 406, 408 and 410. Each of the L2 command-in interfaces 404, 406, 408 and 410 is coupled to a different L2 cache slice. For example, the L2 command-in interface 404 is coupled to the L2 cache slice 424. Each of the L2 command-in interfaces 404, 406, 408 and 410 are configured to receive and administer read and write commands and to transmit these read and write commands to the L2 cache slices 424, 426, 428 and 430, as the case may be for further processing.

The write data interface 422 is configured to receive data that is associated with the write commands transmitted to the command interface 402 and to transmit the data associated with each write command to the appropriate one of the L2 cache slices 424, 426, 428 and 430. The read data interface 464 is configured to receive the requested data associated with a read command from the L2 cache slices 424, 426, 428 and 430 and to transmit the requested data back to the subsystem client that requested the data. Each of the L2 command-out interfaces 468, 470, 472 and 474 is coupled to a different L2 cache slice. The L2 command-out interfaces 468, 470, 472 and 474 are configured to receive and store outgoing commands transmitted from the appropriate one of the L2 cache slices 424, 426, 428 and 430. The commands are then transmitted to the frame buffer logic 355 for further processing. For the purposes of simplicity, the configurations of only the L2 command-in interface 404, the L2 cache slice 424 and the L2 command-out interface 468 will be discussed herein.

The L2 command-in interface 404 includes a write command buffer 412, a read command buffer 414, an arbiter unit 416, a tag look-up unit 418 and a command service buffer 420. The write command buffer 412 and the read command buffer 414 are FIFO (first-in-first-out) stores, where the order of the received commands is preserved. The write command buffer 412 is configured to receive write commands from the crossbar command interface 402 and store these write commands until the commands are selected by the arbiter unit 416 for further processing. Similarly, read command buffer 414 is configured to receive read commands from the crossbar command interface 402 and store these read commands until the commands are selected by the arbiter unit 416 for further processing. The arbiter unit 416 is configured to use standard arbitration techniques to select a read or write command from the write command buffer 412 and the read command buffer 414. The selected read or write command is transmitted from the arbiter unit 416 to the tag look-up unit 418.

Each of the read and write commands received by the tag look-up unit 418 includes a memory address associated with a specific cache line in the L2 cache slice 424. In the case of a read command, the requested data associated with read command is stored in the specific cache line in the L2 cache slice 424 associated with the memory address included in the read command. The requested data associated with the read command either exists in the cache line or is retrieved from the parallel processing memory 204, via the frame buffer logic 355. In the case of a write command, the data associated with the write command is stored in the specific cache line in the L2 cache slice 424 associated with the memory address included in the write command. Once the data associated with the write command is stored in the cache line, the data is referred to as dirty data. Dirty data resident in a cache line is transmitted to the parallel processing memory 204, via the frame buffer logic 355 for storage. Dirty data may not be evicted from the cache line until the data is stored in the parallel processing memory 204.

The tag look-up unit 418 is configured to determine whether the cache line in the L2 cache slice 424 associated with the memory address included in the received read or write command is available. At any given clock cycle, a cache line in the L2 cache slice 424 may be available, may have resident data, or may be reserved for operations that are in progress. The tag look-up unit 418 is configured to reserve an available cache line and if the cache line is unavailable, the tag look-up unit 418 is configured to stall the read or write until the required cache line is available. If the number of unavailable (dirty) cache lines in the specific row in the L2 cache slice 424 associated with the read or write command reaches a maximum pre-defined threshold value, the tag look-up unit 418 is configured to transmit a high-priority clean notification to the L2 command-out interface 468, so that the dirty data stored in the cache lines may be transmitted to the parallel processing memory 204 at the earliest clock cycle. Transmitting a high priority clean will result in dirty data being transmitted from the L2 cache to the parallel processing memory 204, which reduces the number of read and write commands that are stalled because of cache line unavailability.

In the case of a read command, the tag look-up unit 418 is configured to determine whether the data associated with the read command is already resident in a cache line in the L2 cache slice 424. If the data associated with the read command is already resident in a cache line in the L2 cache slice 424, then the tag look-up unit 418 transmits the read command to the command service buffer 420 without reserving a cache line. If the data associated with the read command is not resident in a cache line in the L2 cache slice 424, then the tag look-up unit 418 determines whether a cache line associated with the memory address is available to store that data. If a cache line is available, then the tag look-up unit 418 reserves that cache line for the data associated with the read command and transmits the read command to the L2 command-out interface 468 for further processing. If a cache line is unavailable, then the tag look-up unit 418 is configured to stall the read command until the cache line becomes available.

In the case of a write command, the tag look-up unit 418 is configured to determine whether the cache line associated with the memory address included in the write command already has resident dirty data associated with the same memory address. If the cache line already has resident dirty data associated with the same memory address, then the tag look-up unit 418 is configured to transmit the write command to the command service buffer 420. The data associated with the write command should over-write the dirty data resident in the cache line associated with the write command. If the cache line does not have resident dirty data associated with the same memory address, then the tag look-up unit 418 is configured to determine whether that cache line is available to store the data associated with the write command. If the cache line is available to store the data associated with the write command, then the tag look-up unit 418 is configured to reserve the cache line for the data associated with the write command. The write command is then transmitted to the command service buffer 420. If the cache line is unavailable, then the tag look-up unit 418 is configured to stall the write command until the cache line becomes available.

The command service buffer 420 is configured to receive read and write commands from the tag look-up unit 418. The command service buffer 420 is configured to store the read and write commands and transmit the read and write commands to the L2 cache slice 424 in the order the read and write commands are received.

The L2 cache slice 424 includes a crossbar write data buffer 432, a data slice scheduler 434, four data selectors 436, 438, 440 and 442, four SRAM banks 444, 446, 448 and 450 and four data distributors 452, 454, 456 and 458. The L2 cache slice 424 also includes a crossbar data selector 460, a crossbar read data buffer 462 and a frame buffer data selector 466. The crossbar write data buffer 432 is configured to receive data associated with a write command transmitted from the write data interface 422. The crossbar write data buffer 432 is coupled to each of the data selectors 436, 438, 440 and 442.

The data slice scheduler 434 is configured to receive read and write commands from the command service buffer 420 and the frame buffer logic 355 and is configured to schedule accesses to the SRAM banks 444, 446, 448 and 450 to service those commands. For any given clock cycle, the data slice scheduler 434 is configured to schedule only one data retrieval or storage operation for each of the SRAM banks 444, 446, 448 and 450. In the case of a received read command, the data slice scheduler 434 schedules accesses to the SRAM banks 444, 446, 448 and 450 to retrieve data associated with the read command. The data slice scheduler 434 transmits instructions to the data distributors 452, 454, 456 and 458 to control the flow of data from the SRAM banks 444, 446, 448 and 450 to the crossbar data selector 460 or the frame buffer data selector 466. In the case of a received write command, the data slice scheduler 434 schedules accesses to the SRAM banks 444, 446, 448, and 450 to store data associated with the write command. The data slice scheduler 434 transmits instructions to the data selectors 436, 438, 440 and 442 to control the flow of data to the SRAM banks 444, 446, 448 and 450 from the crossbar write data buffer 432 or the frame buffer logic 355. In addition, the data slice scheduler 434 transmits a dirty data notification to the L2 command-out interface 468 after processing a write command transmitted from the command service buffer 420. This dirty data notification includes the memory address of the cache line associated with the write command and indicates that the cache line has resident dirty data.

The data slice scheduler 434 is configured to give priority to read and write commands transmitted to the frame buffer logic 355 over read and write commands received from command service buffer 420. Read commands transmitted from the frame buffer logic 355 to the data slice scheduler 434 request dirty data resident in the cache line associated with read command at a particular clock cycle. By giving priority to read commands transmitted by the frame buffer logic 355, the data slice scheduler 434 ensures that dirty data resident in a cache line is evicted as quickly possible. The eviction of dirty data from the cache line makes the cache line available for future read and write commands received from the command interface 402 that are associated with that cache line. Further, the frame buffer logic 355 opportunistically transmits dirty data to the parallel processing memory 204 and should receive the dirty data to be transmitted to the parallel processing memory 204 at the specified clock cycle from the cache line. Write commands transmitted from the frame buffer logic 355 indicate that data requested from the parallel memory 204 should be transmitted and stored in the cache line associated with the write command at a particular clock cycle. The requested data stored in the cache line by the frame buffer logic 355 is the requested data associated with an in-progress read command transmitted by the command interface 402. By giving priority to write commands transmitted by the frame buffer logic 355, the data slice scheduler 434 ensures that the data requested by a read command transmitted by the command interface 402 is returned to the subsystem clients that requested the data as quickly as possible and thus, the cache line reserved for the read command may be made available for future read and write commands, and that no dedicated load/store data buffers are required.

In one embodiment, each of the SRAM banks 444, 446, 448 and 450 is a physically-indexed and tagged 16 KB set associative data cache divided into thirty-two rows, where each row has sixteen cache lines of 32 B. The data selectors 436, 438, 440 and 442 are each coupled to a different one of the SRAM banks 444, 446, 448 and 450. For example, the data selector 436 is coupled to the SRAM bank 444. Each of the data selectors 436, 438, 440 and 442 is configured to select data from the crossbar write data buffer 432 or the frame buffer logic 355 based on instructions received from the data slice scheduler 434 and to transmit the selected data to the associated SRAM bank corresponding to that particular data selector. Data transmitted from the data selectors 436, 438, 440 and 442 to the SRAM banks 444, 446, 448 and 450 is stored in cache lines as instructed by the data slice scheduler 434.

Similarly, data from cache lines in the SRAM banks 444, 446, 448 and 450 is transmitted to the data distributors 452, 454, 456 and 458. Each of the SRAM banks 444, 446, 448 and 450 is coupled to a different one of the data distributors 452, 454, 456 and 458. For example SRAM 444 is coupled to the data distributor 452. Each of the data distributors 452, 454, 456 and 458 transmits data received from the SRAM banks 444, 446, 448 and 450 corresponding to that particular data distributor to the crossbar data selector 460 or the frame buffer data selector 466, based on instructions received from the data slice scheduler 434. For example, in the case of a read command received from the command interface 402, where the requested data is available in a cache line in the SRAM bank 450, the data slice scheduler 434 instructs the data distributor 458 to transmit the requested data to the crossbar data selector 460. The crossbar data selector 460 is configured to select data from each of the data distributors 452, 454, 456 and 458 for transmission to the crossbar read data buffer 462. The crossbar read data buffer 462 is a FIFO (first-in-first-out) store that transmits requested data of the processing of read commands to the read data interface 464, in the order the requested data is received. Similarly, in the case of a read command received from the frame buffer logic 355, where the requested data is available in a cache line in the SRAM bank 450, the data slice scheduler 434 instructs the data distributor 458 to transmit the requested data to the frame buffer data selector 466. The frame buffer data selector 466 is configured to select data from each of the data distributors 452, 454, 456 and 458 for transmission to the frame buffer logic 355.

The L2 command-out interface 468 includes a data request buffer 476 and a dirty data notification buffer 478. The data request buffer 476 is configured to store read commands received from the tag look-up unit 418 and to transmit the read commands in the order received to the frame buffer logic 355 for further processing. Similarly, the dirty data notification buffer 478 is configured to store dirty data notifications received from the data slice scheduler 434 and high-priority clean notifications received from the tag look-up unit 418 and to transmit the received dirty data notifications and the high-priority clean notifications in the order received to the frame buffer logic 355.

Figure 4B:
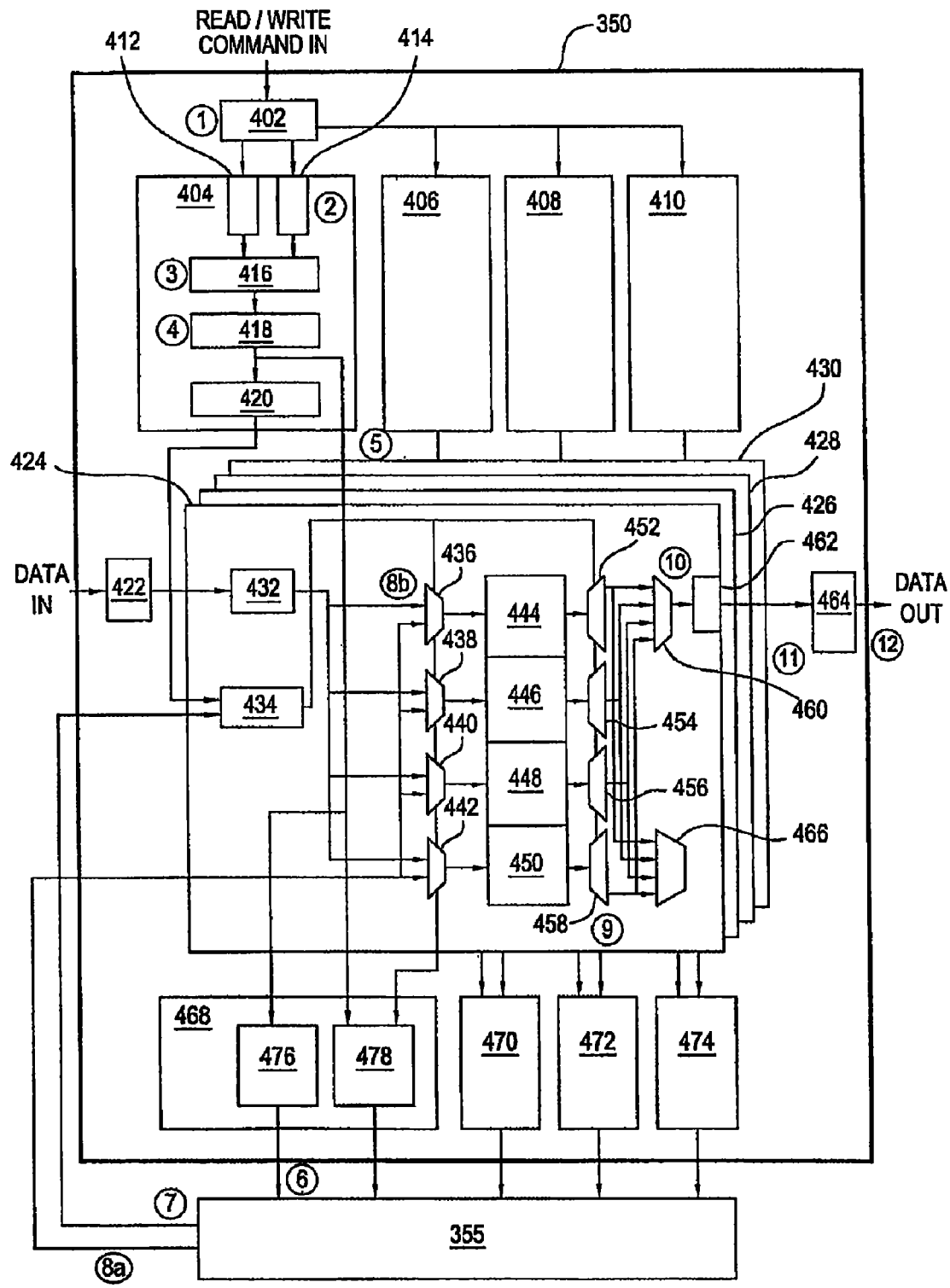
FIG. 4B is a block diagram of the L2 cache of FIG. 3B, illustrating the flow of a read operation within the L2 cache slice, according to one embodiment of the present invention.

FIG. 4B is a block diagram of the L2 cache 350 of FIG. 3B illustrating the flow of a read operation within the L2 cache slice 424, according to one embodiment of the present invention. More specifically, the locations one through twelve on FIG. 4A illustrate the flow of a read command transmitted from the command interface 402 to the L2 cache 350 as well as the flow of the requested data associated with the read command.

At location 1, the command interface 402 receives a read command from a subsystem client and transmits the read command to one of the L2 command-in interfaces 404, 406, 408 and 410 based on the memory address included in the read command. Here, it is assumed for discussion purposes only that, at location 2, the read command is transmitted by the command interface 402 to the L2 command-in interface 404, where the read command is stored in the read command buffer 414. The read command buffer 414 stores the received read command until the read command is selected for further processing by the arbiter unit 416 using standard arbitration techniques. At location 3, the selected read command is transmitted by the arbiter unit 416 to the tag look-up unit 418.

The memory address included in the read command is associated with a cache line in a specific row within one of the SRAM banks 444, 446, 448 and 450, where the data associated with the read command is stored. For the purposes of this discussion only, it is assumed that the cache line associated with the memory address included in the read command is located in a specific row in the SRAM bank 450. At location 4, the tag look-up unit 418 determines whether the data currently residing in the cache line is the data being requested with the read command. If the cache line is not resident, tag look-up unit 418 determines whether the specific cache line associated with the memory address included in the read command is available to receive the data being requested with the read command. If the data currently residing in the cache line is not the data being requested, then the tag look-up unit 418 stalls the read command until the cache line becomes available. However, if the data currently residing in the cache line is the data being requested, then the read command is transmitted to the data slice scheduler 434, via the command service buffer 420 for further processing. The data slice scheduler 434 processes the read command and locations 6-8b are skipped since the requested data does not need to be retrieved from the parallel processing memory 204. In the event that the tag look-up unit 418 determines that the specific cache line associated with the memory address included in the read command is available to receive the data being requested with the read command, then the tag look-up unit 418 reserves the cache line for the data being requested. Reserving a cache line for a read command ensures that, when the data being requested with the read command is retrieved from the parallel processing memory 204, the cache line associated with the memory address included in the read command is ready to store that data. The tag look-up unit 418 transmits the read command to the data request buffer 476 in the L2 command-out interface 468, where the read command is stored.

At location 5, the tag look-up unit 418 also determines the number of unavailable cache lines in the specific row in the SRAM bank 450 that includes the cache line associated with the read command. If the number of unavailable dirty cache lines is greater than a maximum threshold of unavailable cache lines, then the tag look-up unit 418 transmits a high-priority clean notification to the dirty data notification buffer 478.

At location 6, the read command is transmitted to the frame buffer logic 355 for further processing. The frame buffer logic 355 prioritizes and organizes read commands to retrieve the data being requested with the read commands from the parallel processing memory 204 in an optimized manner. At location 7, the frame buffer logic 355 transmits a write command to the data slice scheduler 434 that indicates the specific clock cycle at with the frame buffer logic 355 will transmit the requested data associated with the processed read command to the cache line reserved for the read command by the tag look-up unit 418 at location 4.

At location 8a and at the specified clock cycle, the frame buffer logic 355 transmits the data associated with the processed read command to the data selector 442, which is the data selector associated with the SRAM bank 450—the SRAM bank where the reserved cache line is located. At location 8b, the data slice scheduler 434 ensures that there are no other read or write accesses scheduled to the particular SRAM bank 450 at the clock cycle specified in the write command received from the frame buffer logic 355 and transmits instructions to the data selector 442 to select data from the frame buffer logic 355 at that particular clock cycle. The data selector 442 then transmits the data associated with the processed read command received from the frame buffer logic 355 to the reserved cache line in the SRAM bank 450 for storage.

Once the data associated with the read command is resident in the cache line, the data may be returned to the requesting client. At location 9, the data associated with the processed read command is transmitted to the data distributor 458 in such instances. At location 10, the data distributor 458 transmits the data associated with the processed read command to the crossbar data selector 460, based on instructions received from the data slice scheduler 434. The crossbar data selector 460 selects the data associated with the processed read command and transmits the data to the crossbar read data buffer 462 for storage. At location 11, the crossbar read data buffer 462 transmits the data to the read data interface 464, which, at location 12, transmits the data to the subsystem client that transmitted the read command at location 1.

Figure 4C:
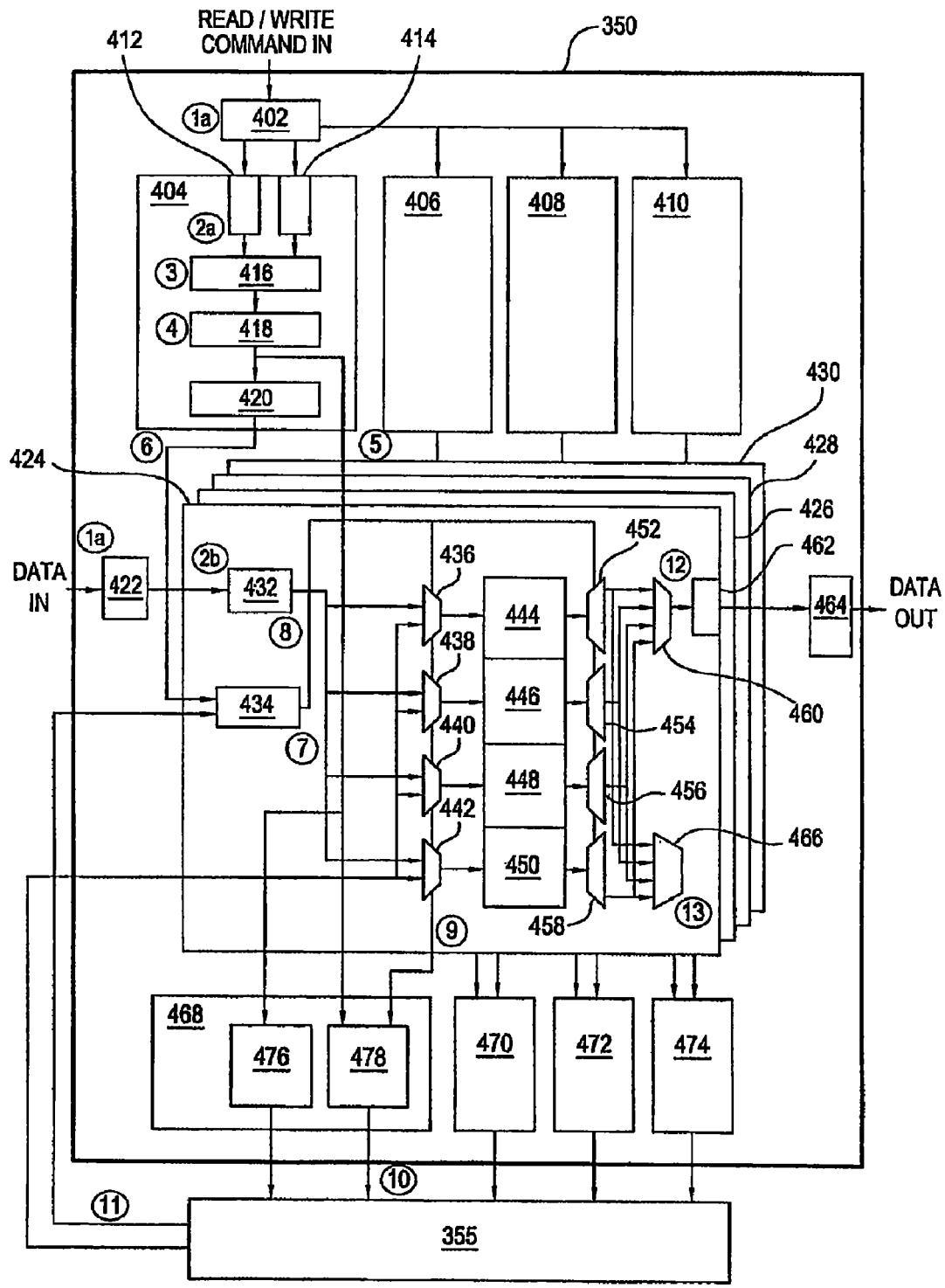
FIG. 4C is a block diagram of the L2 cache of FIG. 3B, illustrating the flow of a write operation within the L2 cache slice, according to one embodiment of the present invention.

FIG. 4C is a block diagram of the L2 cache 350 of FIG. 3B illustrating the flow of a write operation within the L2 cache slice 424, according to one embodiment of the present invention. More specifically, the locations one through thirteen on FIG. 4C illustrate the flow of a write command as well as the data associated with the write command transmitted from the command interface 402 through the L2 cache 350.

At location 1a, the command interface 402 receives a write command from a subsystem client and transmits the write command to one of the L2 command-in interfaces 404, 406, 408 and 410 based on the memory address included in the write command. Here, it is assumed for discussion purposes only that, at location 2a, the write command is transmitted by the command interface 402 to the L2 command-in interface 404, where the write command is stored in the write command buffer 412. The write command buffer 412 stores the received write command until the write command is selected for further processing by the arbiter unit 416 using standard arbitration techniques. At location 1b, the data crossbar interface 422 receives data associated with the write command received by the command interface 402 from the subsystem client. At location 2b, the data associated with the write command is transmitted to the crossbar write data buffer 432 where the data is temporarily stored until the data is transmitted to the one of the SRAM banks 444, 446, 448, 450.

At location 3, the selected write command is transmitted by the arbiter unit 416 to the tag look-up unit 418. The memory address included in the write command is associated with a cache line in a specific row within one of the SRAM banks 444, 446, 448 and 450, where the data associated with the write command is stored. For the purposes of this discussion only, it is assumed that the cache line associated with the memory address included in the write command is located in a specific row in the SRAM bank 444. At location 4, the tag look-up unit 418 determines whether the specific cache line associated with the memory address included in the write command is already reserved for another write command associated with the same memory address. If the specific cache line is already reserved for another write command associated with the same memory address, then the tag look-up unit 418 then the write command is transmitted to the data slice scheduler 434, via the command service buffer 420. The data slice scheduler 434 processes the write command, and the data associated with the write command is stored in the cache line, overwriting the previously resident dirty data. If the specific cache line is not reserved for another write command associated with the same memory address, then the tag look-up unit 418 determines whether the cache line is available to receive the data associated with the write command. If the cache line is unavailable, then the tag look-up unit 418, then the tag look-up unit 418 stalls the write command until the cache line becomes available.

In the event that the tag look-up unit 418 determines that the specific cache line associated with the memory address included in the write command is in a suitable state to receive the data associated with the write command, then the tag look-up unit 418 reserves the cache line for the data associated with the write command. The tag look-up unit 418 then transmits the write command to the command service buffer 420. Reserving a cache line for a write command ensures that, when the data associated with the write command is transmitted to the SRAM bank 444, the cache line associated with the memory address included in the write command is ready to store that data. At location 5, the tag look-up unit 418 also determines the number of unavailable dirty cache lines in the specific row in the SRAM bank 444 that includes the cache line associated with the write command. If the number of unavailable cache lines is greater than a maximum threshold of unavailable cache lines, then the tag look-up unit 418 transmits a high-priority clean notification to the dirty data notification buffer 478.

At location 6, the write command is transmitted from the command service buffer 420 to the data slice scheduler 434 in the L2 command slice 424. At location 7, the data slice scheduler 434 schedules access to the SRAM bank 444 so that the data associated with the write command may be stored in the reserved cache line in the SRAM bank 444. At location 8, the data associated with the write command is transmitted by the crossbar write data buffer 432 to the data selector 436. The data slice scheduler 434 transmits instructions to the data selector 436 to select the data associated with the write command from the crossbar write data buffer 432. The selected data is transmitted from the data selector 436 to the SRAM bank 444, where the data is stored in the reserved cache line. As described in conjunction with FIG. 4A, once the data associated with a write command received from the command interface 402 is stored in a cache line in one of the SRAM banks 444, 446, 448 and 350, the data is referred to as dirty data and may not be evicted from the cache line until the data is stored in the parallel processing memory 204.

At location 9, if the cache line associated with the write command did not previously include resident dirty data, then a dirty data notification is transmitted by the data slice scheduler 434 to the dirty data notification buffer 478 in the L2 cache command-out interface 468. The dirty data notification indicates resident dirty data in the specific cache line in the SRAM bank 444 associated with the write command and includes the memory address of the cache line. At location 10, the dirty data notification and any high-priority clean notifications are transmitted by the dirty data notification buffer to the frame buffer logic 355 for further processing. The frame buffer logic 355 prioritizes and organizes the transmission of dirty data from the SRAM banks 444, 446, 448 and 450 to the parallel processing 204. The frame buffer logic 355 is configured to give the highest priority to a high-priority clean notification that may be transmitted by the tag look-up unit 418 at location 4.

At location 11, the frame buffer logic 355 transmits a read command to the data slice scheduler 434, indicating a data request at a particular clock cycle for the dirty data stored in the specific cache line associated with the write command. As described in conjunction with FIG. 4A, the data slice scheduler gives priority to read and write commands received from the frame buffer logic 355 and schedules the transmission of the dirty data being requested at the clock cycle specified by the frame buffer logic 355.

At location 12, the dirty data is transmitted from the SRAM bank 444 to the data distributor 452. The cache line reserved for the processed write command is now empty and may be used for storing data associated with future read or write operations. The data distributor 452 transmits the dirty data to the frame buffer data selector 466, based on instructions received from the data slice scheduler 434. At location 13, the frame buffer data selector 466 selects the dirty data from the data distributor 452 and the selected dirty data is transmitted to the frame buffer logic 355. The frame buffer logic 355 transmits the dirty data to the parallel processing memory 204 for storage.

Figure 5A:
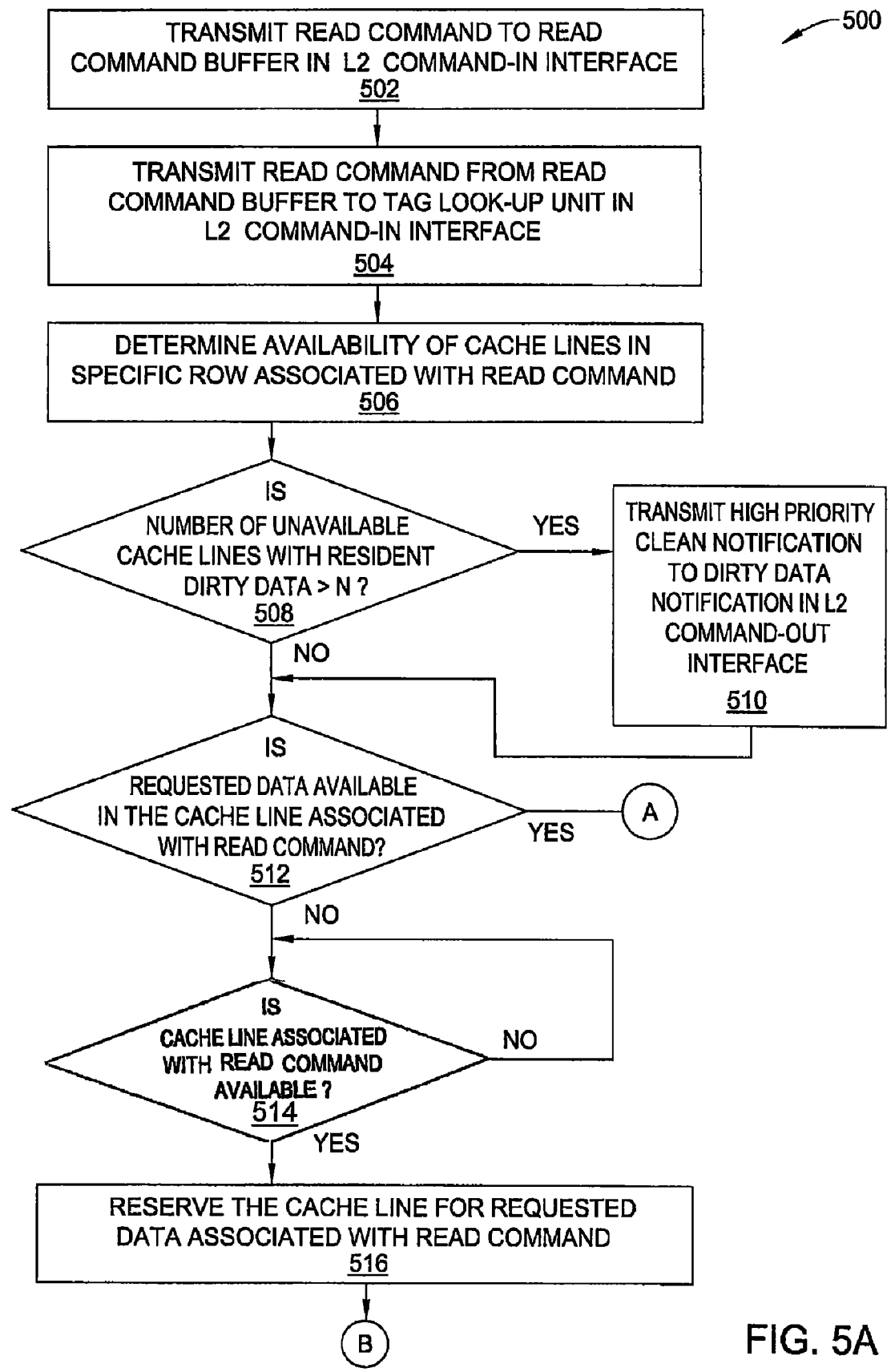
FIGS. 5A and 5B set forth a flow diagram of method steps for processing a read operation within the L2 cache of FIG. 3B, according to one embodiment of the present invention.
Figure 5B:
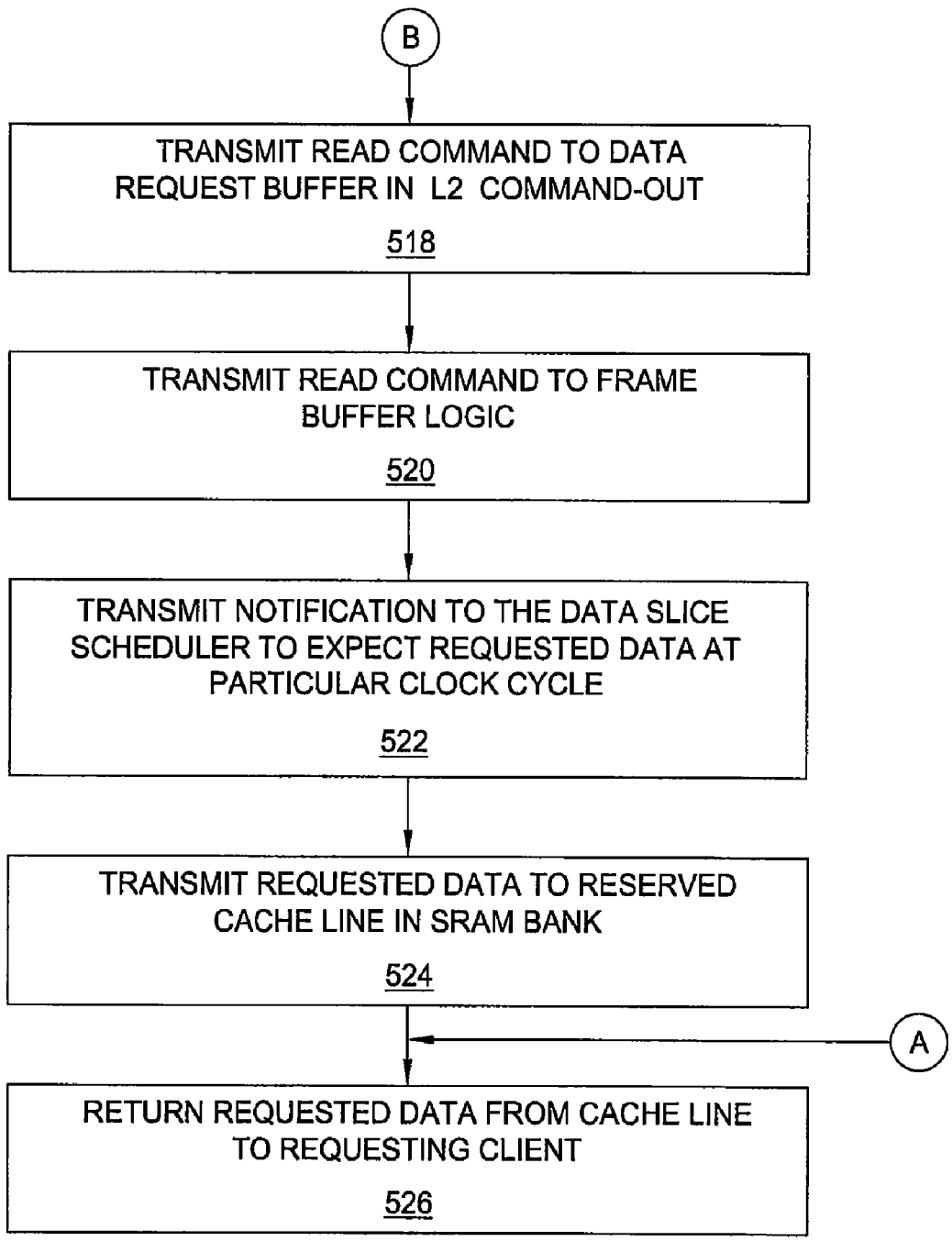

FIGS. 5A and 5B set forth a flow diagram of method steps for processing a read operation within the L2 cache 350 of FIG. 3B, according to one embodiment of the present invention. Although the method steps are described in conjunction with the systems for FIGS. 1-4B, persons skilled in the art will understand that any system configured to perform the method steps, in any order, is within the scope of the invention.

The method 500 begins at step 502, where a read command is transmitted from the command interface 402 to the read command buffer 414 in the L2 command-in interface 404, via the crossbar command interface 402. The read command is stored in the read command buffer 414 until the read command is selected for by the arbiter unit 416 using standard arbitration techniques for further processing. At step 504, the arbiter unit 416 transmits the selected read command to the tag look-up unit 418.

The read command includes a memory address associated with a cache line within a specific row in one of the SRAM banks 444, 446, 448 and 450 within the L2 cache slice 424. For the purposes of this discussion only, it is assumed that the cache line associated with the memory address included in the read command is located in a specific row in the SRAM bank 450. At step 506, the tag look-up unit 418 determines the number of unavailable cache lines in the specific row associated with the memory address included in the read command. At step 508, if the number of unavailable dirty cache lines is greater than a pre-determined threshold, then the method step proceeds to step 510. At step 510, the tag look-up unit 418 transmits a high-priority clean notification to the dirty data notifications buffer 478 in the L2 command-out interface 468 and the method step proceeds to step 512. If, at step 508, the number of unavailable cache lines is less than a pre-determined threshold, then the method step proceeds directly to step 512.

At step 512, the tag look-up unit 418 determines whether the data being requested with the read command is available in the cache line associated with the memory address included in the read command. If the data being requested is available, then the method 500 proceeds directly to step 526, as the data does not need to be retrieved from the parallel processing memory. If at step 512, the data being requested is not available in the cache line, then the method 500 proceeds to step 514.

At step 514, the tag look-up unit 418 determines if the cache line associated with the memory address included in the read command is available for storing the data being requested with the read command. If the cache line is not available, the method 500 returns to step 514 and continues to loop in this fashion until the cache line is available. If the cache line is available, then the method 500 proceeds to step 516. At step 516, the cache line is reserved for storing the data being requested with the read command. At step 518, the tag look-up unit 418 transmits the read command to the data request buffer 476 in the L2 command-out interface 468 where the read command is temporarily stored.

At step 520, the read command is transmitted to the frame buffer logic 355 for further processing. As described in conjunction with FIG. 4A, the frame buffer logic prioritizes and organizes received read commands, such that, the data being requested is retrieved from the parallel processing memory in an efficient manner. At step 522, the frame buffer logic 355 transmits a write command to the data slice scheduler 434 in response to the processed read command. The write command includes the memory address associated with the reserved cache line and a specific clock cycle at which the frame buffer logic 355 shall transmit the data being requested.

At step 524, the frame buffer logic 355 transmits the data being requested with the processed read command to the reserved cache line in the SRAM bank 450, via the data selector 436. The data slice scheduler 434 guarantees that no other data storage or data transmission is scheduled to the SRAM bank 450 at the particular clock cycle specific by the frame buffer logic 355. At step 526, the data being requested with the processed read command is transmitted to the data distributor 458 which in-turn transmits that data to the crossbar data selector 460. The crossbar data selector 460 selects the data being requested with the processed read command and transmits that data to the crossbar read data buffer 462 where the data is temporarily stored. The data being requested with the read command is then transmitted to the subsystem client that transmitted the read command.

Figure 6A:
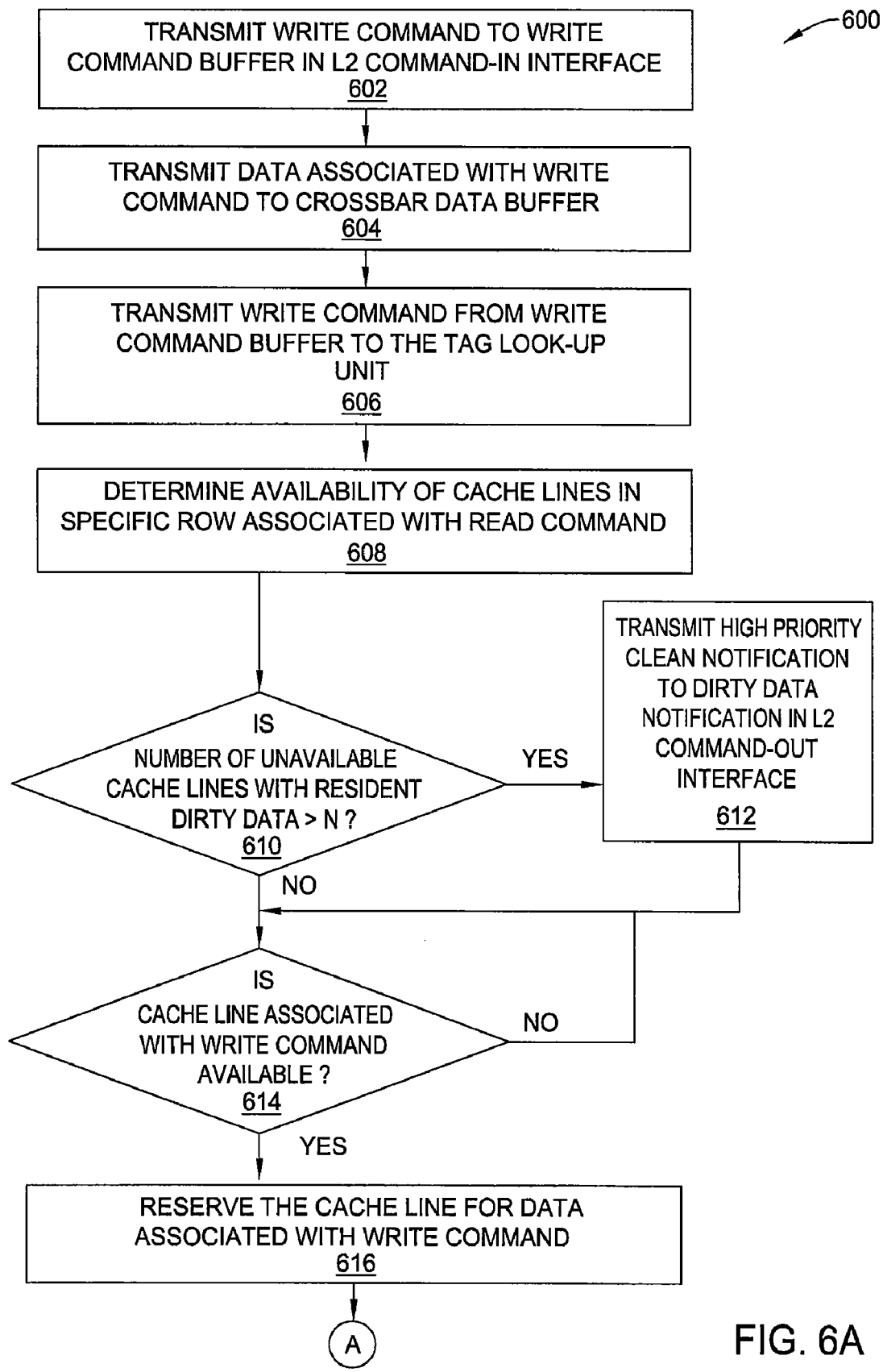
FIGS. 6A and 6B set forth a flow diagram of method steps for processing a write operation within the L2 cache of FIG. 3B, according to one embodiment of the present invention.
Figure 6B:
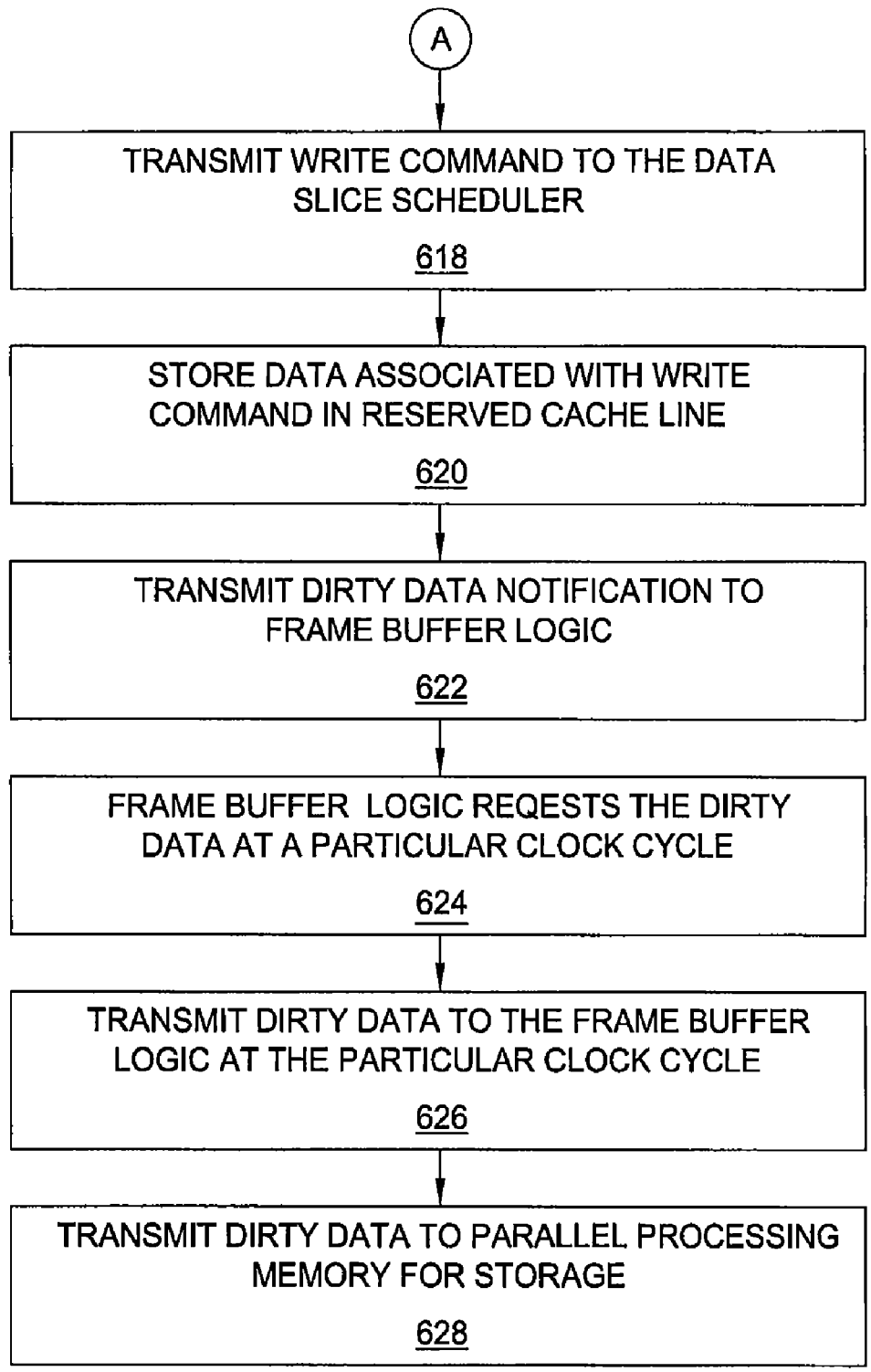

FIGS. 6A and 6B set forth a flow diagram of method steps for processing a write operation within the L2 cache 350 of FIG. 3B, according to one embodiment of the present invention. Although the method steps are described in conjunction with the systems for FIGS. 1-4B, persons skilled in the art will understand that any system configured to perform the method steps, in any order, is within the scope of the invention.

The method 600 begins at step 602, where a write command is transmitted from a subsystem client to the write command buffer 412 in the L2 command-in interface 404, via the crossbar command interface 402. At step 604, the data associated with the write command is transmitted to the crossbar write data buffer 432, via the write data interface 422, where the data is stored. The write command is stored in the write command buffer 412 until the write command is selected for by the arbiter unit 416 using standard arbitration techniques for further processing. At step 606, the arbiter unit 416 selects the write command from the write command buffer 412 and transmits the selected write command to the tag look-up unit 418.

The memory address included in the write command is associated with a cache line in a specific row within one of the SRAM banks 444, 446, 448 and 450 within the L2 cache slice 424, where the data associated with the write command is stored. For the purposes of this discussion only, it is assumed that the cache line associated with the memory address included in the write command is located in a specific row in the SRAM bank 444. At step 608, the tag look-up unit 418 determines the number of unavailable dirty cache lines in the specific row associated with the memory address included in the read command. At step 610, if the number of unavailable dirty cache lines is greater than a pre-determined threshold, then the method step proceeds to step 612. At step 612, the tag look-up unit 418 transmits a high-priority clean notification to the dirty data notifications buffer 478 in the L2 command-out interface 468 and the method 600 proceeds to step 614. If, at step 610, the number of unavailable cache lines is less than the pre-determined threshold, then the method 600 proceeds directly to step 614.

At step 614, the tag look-up unit 418 determines if the cache line associated with the memory address included in the write command is available for the processing of the write command. If the cache line is not available, the method 600 returns to step 614 and continues to loop in this fashion until the cache line is available. If the cache line is available, the method 600 proceeds to step 616. At step 616, the cache line is reserved for storing the data associated with the write command.

At step 618, the tag look-up unit 418 transmits the write command to the data slice scheduler 434. The data slice scheduler 434 schedules a write access to the SRAM bank 444 at a particular clock cycle for the data associated with the write command. At step 620, the data associated with the write command is transmitted to the reserved cache line in the SRAM bank 444, where the data is stored. At step 622, the data slice scheduler 434 transmits a dirty data notification to the frame buffer logic 355, via the dirty data notification buffer 478 in the L2 command-out interface 468. As described in conjunction with FIG. 4A, the frame buffer logic 355 prioritizes and organizes received dirty data notifications, such that, the dirty data is transmitted to the parallel processing memory 204 in an efficient manner.

At step 624, the frame buffer logic 355 transmits a read command to the data slice scheduler 434 requesting the resident dirty data in the reserved cache line. The frame buffer logic 355 also specifies a particular clock cycle at which the frame buffer logic 355 should receive the dirty data. At step 626, the data slice scheduler 434 schedules the transmission of the dirty data from the reserved cache line at the specified clock cycle. At step 628, the dirty data is transmitted from the reserved cache line, via the data distributor 458, to the frame buffer logic 355 at the specified clock cycle. The cache line that was reserved for the processed write command is made available for the data associated with future read and write operations. At step 630, the frame buffer logic 355 transmits the dirty data to the parallel processing memory 240 for storage.

In sum, the data cache of a L2 cache slice may be used as a load/store buffer for the frame buffer logic by enforcing specialized cache administration policies. Upon receiving read or write command that requires data to be loaded from or stored to the parallel processing memory, the tag look-up in the L2 command-in interface of the L2 cache slice determines whether there is cache line availability for a specific cache line in a particular SRAM bank for the data associated with the read or write command. If the cache line is occupied, the read or write request is stalled until resident data in the data set is evicted to free up the cache line. However, if the tag look-up is able to determine that the cache line in the SRAM bank is available, then the cache line is reserved for the incoming read/write data.

In the case of a read request, the tag look-up unit forwards the read request to the frame buffer logic for processing. The frame buffer logic services the read request opportunistically and transmits a notification to the data slice scheduler in the L2 cache slice to alert the data slice scheduler to expect the requested data from the frame buffer logic at a particular clock cycle. In the notification, the frame buffer logic also specifies the address of the cache line in an SRAM bank of the L2 cache slice where the requested data should reside in. The data slice scheduler ensures that the SRAM bank has the cache line that requested data should be written to is available at the desired clock cycle. Once the data is written to the reserved cache line the data may then be transmitted from the L2 cache slice to the requesting component within the parallel processing subsystem 112.

In the case of a write request, the write data transmitted by a requesting client (such as I/O Unit, ROP or GPCs) to the L2 cache slice is stored in the cache line reserved by the tag look-up in the specific SRAM bank of the L2 cache slice. The data slice scheduler transmits a dirty data notification to the frame buffer logic, which includes the memory address of the cache line with the SRAM bank associated with the dirty data. When the frame buffer logic is ready to write the data to the parallel processing memory, a read request is transmitted by the frame buffer logic to the data slice scheduler in the L2 cache slice to transmit the dirty data resident in the specific cache line associated with the dirty data at a particular clock cycle. The data slice scheduler in the L2 cache slice ensures the data requested by the frame buffer logic is transmitted to the frame buffer logic at the desired clock cycle after which the L2 cache slice is free to evict the dirty data and reuse the cache line.

Advantageously, the scheduling and prioritizing capabilities of the data slice scheduler along with the cache line reservation capability of the tag look-up unit allows the L2 cache to eliminate the need for separate load and store buffers for data being received from or transmitted to the parallel processing memory. In addition, the high-priority clean notification transmitted to the frame buffer logic to transmit dirty data from a group of cache lines ensures that the number of stalls due to cache line unavailability caused by resident dirty data is minimized.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for processing a read operation received by an intermediary cache coupled to one or more clients and to an external memory, the method comprising:
   receiving a read command from a client, wherein the read command includes a corresponding memory address for data being requested by the read command;
   determining a row in one bank of multiple banks within a data cache associated with the read command based on the corresponding memory address;
   determining that a cache line within the row is available for the requested data;
   reserving the cache line until the requested data is stored in the cache line to ensure that when the requested data is retrieved from the external memory the cache line is available for storing the requested data;
   scheduling a write access that stores the requested data in the cache line;
   receiving, from memory logic associated with the external memory, a write command that includes a specific clock cycle at which the memory logic is to transmit the requested data from the external memory to the reserved cache line; and
   prioritizing the write command received from the memory logic over additional read commands and write commands received from the one or more clients.

2. The method of claim 1, further comprising the step of transmitting the read command to the memory logic to retrieve the requested data from the external memory.

3. The method of claim 1, further comprising the step of ensuring that no other read or write accesses involving the row within the data cache associated with the read command are scheduled at the specific clock cycle.

4. The method of claim 1, further comprising the step of transmitting instructions to a data selector coupled between the memory logic and the row to select the requested data from the memory logic at the specific clock cycle.

5. The method of claim 1, further comprising the steps of selecting the requested data from the memory logic at the specific clock cycle and storing the requested data in the cache line.

6. The method of claim 5, further comprising the step of transmitting the requested data from the cache line to the client.

7. The method of claim 1, further comprising the step of determining that more than N cache lines within the row within the data cache are unavailable for the requested data, where N is a positive integer.

8. The method of claim 7, further comprising the step of transmitting a high-priority clean notification to the memory logic associated with the external memory to write dirty data residing in the unavailable cache lines to the external memory.

9. An intermediary cache coupled to one or more clients and to an external memory and configured to process a read operation, the intermediary cache comprising:
   a data cache;
   a read command buffer configured to receive a read command from a client, wherein the read command includes a corresponding memory address for data being requested by the read command;
   a tag look-up unit configured to:
      determine a row in one bank of multiple banks within the data cache associated with the read command based on the corresponding memory address,
      determine that a cache line within the row is available for the requested data, reserve the cache line until the requested data is stored in the cache line to ensure that when the requested data is retrieved from the external memory the cache line is available for storing the requested data, and schedule a write access operation that stores the requested data in the cache line; and a data slice scheduler configured to:

receiving, from memory logic associated with the external memory, a write command that includes a specific clock cycle at which the memory logic is to transmit the requested data from the external memory to the reserved cache line; and prioritize the write command received from memory logic over additional read commands and write commands received from the one or more clients.

10. The intermediary cache of claim 9, further comprising a data request buffer configured to receive the read command from the tag look-up unit and to transmit the read command to the memory logic.

11. The intermediary cache of claim 9, wherein the data slice scheduler is further configured to ensure that no other read or write accesses involving the row within the data cache associated with the read command are scheduled at the specific clock cycle.

12. The intermediary cache of claim 9, further comprising a data selector coupled between the memory logic and the data cache, and wherein the data slice scheduler is further configured to transmit instructions to the data selector to select the requested data from the memory logic at the specific clock cycle.

13. The intermediary cache of claim 9, wherein a data selector is configured to select the requested data from the memory logic at the specific clock cycle and store the requested data in the cache line.

14. The intermediary cache of claim 13, further comprising a crossbar data selector coupled to different portions of the data cache and configured to receive the requested data from the cache line and transmit the requested data to the client.

15. The intermediary cache of claim 9, wherein the client comprises a graphics processing cluster or a raster operations unit.

16. The intermediary cache of claim 9, where in the tag look-up unit is configured to determine that more than N cache lines within the row within the data cache are unavailable for the requested data, where N is a positive integer.

17. The intermediary cache of claim 16, wherein the tag look-up unit is further configured to transmit a high-priority clean notification to memory logic associated with the external memory to write dirty data residing in the unavailable cache lines to the external memory.

18. A computing device, comprising:

a graphics processing cluster;

a cross bar unit coupled to the graphics processing cluster and configured to route transactions to and from the graphics processing cluster; and a memory partition unit coupled to the cross bar unit and an external memory and including:

a raster operations unit, memory logic associated with the external memory, and an intermediary cache coupled to the cross bar, the raster operations unit and the memory logic and including:

a data cache, a read command buffer configured to receive a read command from the graphics processing cluster or the raster operations unit, wherein the read command includes a corresponding memory address for data being requested by the read command, and a tag look-up unit configured to:

determine a row in one bank of multiple banks within the data cache associated with the read command based on the corresponding memory address, determine that a cache line within the row is available for the requested data, reserve the cache line until the requested data is stored in the cache line to ensure that when the requested data is retrieved from the external memory the cache line is available for storing the requested data, and transmit the read command to the memory logic for the requested data, and a data slice scheduler configured to:

receive a write command from the memory logic that includes a specific clock cycle at which the memory logic is to transmit the requested data from the external memory to the reserved cache line, prioritize the write command received from the memory logic over additional read commands and write commands received from the graphics processing cluster, ensure that no other read or write accesses involving the row within the data cache associated with the read command are scheduled at the specific clock cycle, and transmit instructions to select the requested data from the memory logic at the specific clock cycle.

\* \* \* \* \*

UNITED STATES PATENT AND TRADEMARK OFFICE
CERTIFICATE OF CORRECTION

PATENT NO. : 8,234,478 B1
APPLICATION NO. : 12/256400
DATED : July 31, 2012
INVENTOR(S) : James Roberts et al.

It is certified that error appears in the above-identified patent and that said Letters Patent is hereby corrected as shown below:

In Column 21, Claim 9, Line 5, after "schedule a write access" please delete "operation".

Signed and Sealed this
Nineteenth Day of February, 2013

Teresa Stanek Rea
*Acting Director of the United States Patent and Trademark Office*